US005983508A

United States Patent [19]

Sundström

[11] Patent Number: 5,983,508

[45] Date of Patent: Nov. 16, 1999

[54] METHOD AND APPARATUS FOR ADJUSTING THE TENSION ON A SAW CHAIN

[75] Inventor: Erik Sundström, Sandviken, Sweden

[73] Assignee: Sandvik Aktiebolag, Sandviken, Sweden

[21] Appl. No.: 09/090,233

[22] Filed: Jun. 4, 1998

[30] Foreign Application Priority Data

Jun. 4, 1997 [SE] Sweden .................................. 9702111

[51] Int. Cl.[6] ............................ B23D 57/02; B27B 17/14

[52] U.S. Cl. ................................................. 30/386; 30/383

[58] Field of Search ......................... 30/386, 383; 83/816

[56] References Cited

U.S. PATENT DOCUMENTS

| | | | |
|---|---|---|---|
| 4,939,842 | 7/1990 | Rebhan | 30/386 |
| 5,070,618 | 12/1991 | Edlund . | |
| 5,353,506 | 10/1994 | Muller et al. . | |
| 5,491,899 | 2/1996 | Schliemann et al. . | |
| 5,497,557 | 3/1996 | Martinsson . | |
| 5,528,835 | 6/1996 | Ra . | |

FOREIGN PATENT DOCUMENTS

| | | |
|---|---|---|
| 42 22 075 | 1/1994 | Germany . |

OTHER PUBLICATIONS

Brochure: "INTENZ—Chain Saw Bars From Oregon" Blount Europe SA 1998 (2pp.).

*Primary Examiner*—Douglas D. Watts
*Attorney, Agent, or Firm*—Burns, Doane, Swecker & Mathis, L.L.P.

[57] ABSTRACT

A chain saw includes a motor unit and a guide bar clamped thereto by a clamping plate. The guide bar, which supports a saw chain, has a longitudinal slot formed therein. Clamping bolts carried by the motor unit pass through the slot and through the clamping plate for securing the clamping plate to the motor unit. One (or both) of the side edges of the slot includes corrugations. The clamping plate includes a hole aligned with the corrugations to enable a toothed key to be arranged in meshing engagement with the corrugations whereby a rack-and-pinion relationship is formed. By manually rotating the key, the guide bar is longitudinally displaced for varying the tension on the saw chain.

6 Claims, 1 Drawing Sheet

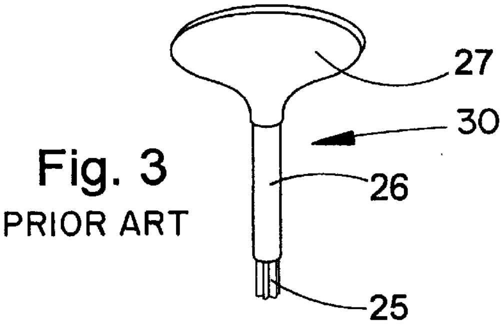
Fig. 3
PRIOR ART
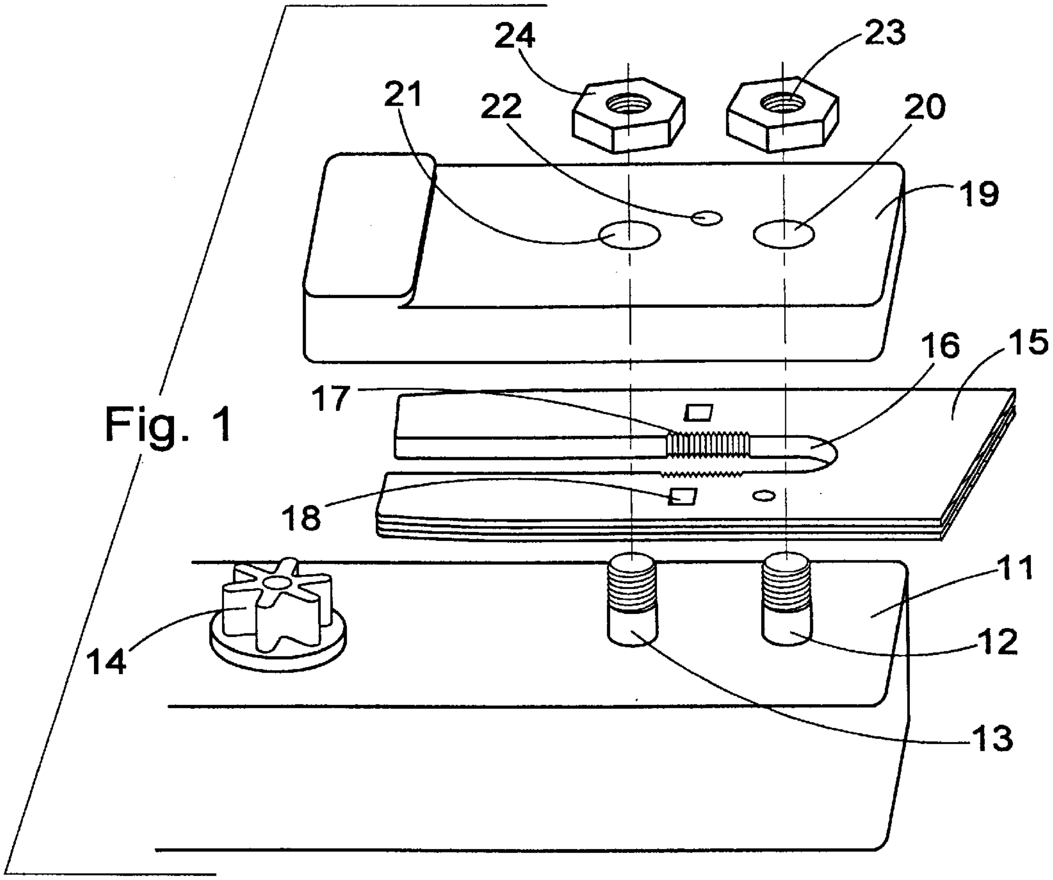
Fig. 1
Fig. 2
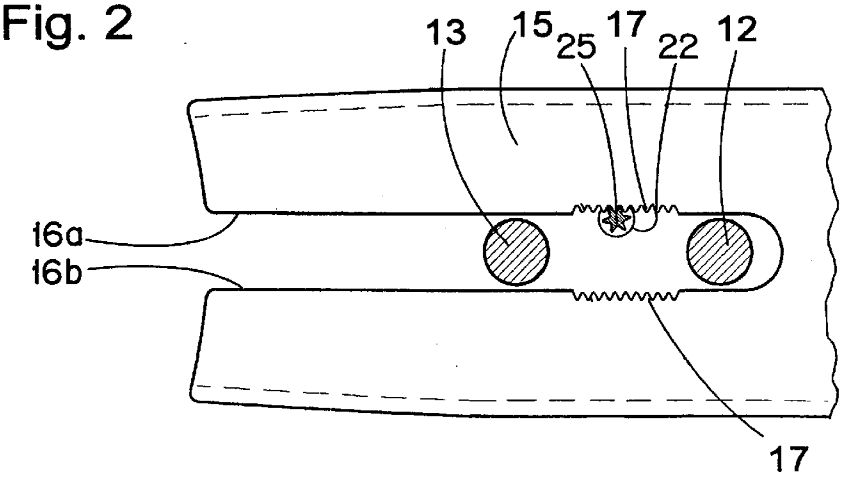

METHOD AND APPARATUS FOR ADJUSTING THE TENSION ON A SAW CHAIN

BACKGROUND OF THE INVENTION

The present invention relates to a chain saw having a longitudinally displaceable guide bar for varying the tension on the saw chain.

For proper operation of a chain saw the saw chain has to be tight with a proper tensioning force. The guide bar is during operation clamped to the motor unit of the chain saw machine by a clamping plate which is normally held by two nuts threaded onto two bolts fixed to the motor unit and penetrating through a slot in the guide bar. When the chain tension is to be adjusted, e.g., when a chain is worn or when mounting a new chain, the nuts are left slightly loose, and the guide bar is pulled outwards by hand, or by some mechanism actuated by screwdrivers or wheels. Such mechanisms, which are usually located in the motor unit as described in the following patents: U.S. Pat. No. 5,528,835, No. 5,353,506, No. 5,491,899, German Document No. 42 22075, U.S. Pat. No. 5,497,557 and No. G-93 11081, push the guide bar outwards, e.g., by a peg penetrating a hole in the guide bar which is offset to one side of the bolt slot. To move the peg many different mechanisms have been used, employing helical or conical gears, cams or angular levers.

One main problem has been, however, to reach the actuating means. Since the strength of the guide bar in this critical region does not allow any extra cutouts to be formed therein, most designs involve an actuating means accessible behind the guide bar, often only by turning the chain saw upside down, which makes it difficult and time-consuming to adjust the chain tension. In some cases it has been attempted to control the peg movement from the same side as the nuts, such as German Document 44 36300 where the peg itself is rotated and connected by conical gears to a nut on a threaded shaft, which requires a special clamping plate with an oblong hole and which presents difficulties to arrange suitable bearings for the rotatable peg. In German Document G-93 11081, one of the nuts is connected by hollow spline shifts, helical gears and slip clutches to the screw mechanism for moving the peg, which requires an extra wide bolt slot to accommodate the hollow spline shaft.

All those mechanisms are rather complicated, employing a multitude of components and making the shell of the motor unit larger and difficult to produce. They also share the disadvantage that before fitting a new chain or guide bar, the peg has to be reset rearward.

Another type of tensioning mechanism is described in U.S. Pat. Nos. 4,939,842 and 5,070,618 where a gear wheel with a shaft journalled in the clamping plate acts on a rack part of the bolt slot, or a gear wheel with a shaft without any proper journal but guided by a hole in the guide bar acts on a rack surface in a recess in the motor casing. In both cases the shaft is rotated with a screwdriver. Disadvantages involve an insufficient journal support of the shaft, and the need of a relatively large gear diameter which requires a strong hand torque. The latter patent requires a difficult machining of the recess in the motor casing.

SUMMARY OF THE INVENTION

The present invention involves a guide bar which allows tensioning of the saw chain using only commonly available standard tools, on one side of the chain saw, and which needs no peg mechanism at all, and which does not require any resetting of a peg. The guide bar can still be used with existing chain saws having a peg mechanism.

In particular, the invention pertains to a chain saw comprising a motor unit, a guide bar, and a clamping plate. The guide bar is attached to the motor unit and supports a saw chain. A portion of the guide bar includes a slot extending in a longitudinal direction therein. The slot includes a pair of opposing longitudinal side surfaces. At least one of the side surfaces includes corrugations formed therein, the corrugations extending perpendicularly to the longitudinal direction. The clamping plate is mounted to the motor unit such that the portion of the guide bar in which the slot is formed is clamped between the motor unit and the clamping plate. The corrugations are adapted to be engaged by a toothed turning tool for longitudinally displacing the guide bar, to adjust the tension on the saw chain.

The invention also pertains to a method of adjusting the tension on a saw chain.

BRIEF DESCRIPTION OF THE DRAWINGS

The invention is described with reference to the figures, wherein:

FIG. 1 shows a split view of the relevant parts of a chain saw according to the invention, FIG. 2 is a detail view of the rear end of a guide bar of FIG. 1; and FIG. 3 is a view of a standard key for turning certain screw types.

DETAILED DESCRIPTION OF PREFERRED EMBODIMENTS OF THE INVENTION

FIG. 1 shows a the clamping portion of a chain saw motor unit (11) with two clamping bolts (12,13) and a drive sprocket (14) for a saw chain, which when mounted will be running around a guide bar (15). The chain is tensioned by moving the guide bar (15) in a direction away from the drive sprocket (14). In traditional chain saw machines the guide bar is moved by a peg penetrating a hole (18). With the present invention no peg is needed, but the hole may be retained to allow use of the guide bar with existing chain saws. The direction of the guide bar is defined by a longitudinal slot (16) enclosing the lower portions of the clamping bolts (12,13) which are preferably non-threaded. Above the guide bar (15) is a clamping plate (19) with two holes (20, 21) through which the clamping bolts (12,13) pass. Two nuts (23,24) are threaded onto the ends of the clamping bolts and tightened to clamp the guide bar (15) to the motor unit (11) when die chain has its proper tension.

According to the invention, one of the opposing side surfaces (16*a*,16*b*) of the slot (16) is made with corrugations (17) if the guide bar is not reversible; both of the side surfaces possess corrugations if the guide bar is intended to be reversible. The corrugations extend perpendicular to the longitudinal direction of the slot and are recessed in the respective side surface, whereby the pointed tips of the corrugations are flush with the non-corrugated portions of the side surfaces. Thus, the direction of the guide bar is properly defined even if a bolt (12,13) is contacting the corrugations. The clamping plate (19) has a cylindrical through-hole (22) offset from the center line between the bolt holes (20,21). The amount of offset, the shape of the corrugations (17) and the diameter of the cylindrical hole (22) are chosen so that the hole (22) is aligned with the corrugations, whereby a manually rotatable turning tool in the form of a toothed key (30) shown in FIG. 3 can be inserted through the hole (22) and mesh with the corrugations. The key includes a shank having a cylindrical portion (26) and a toothed portion (25) disposed below the cylindrical portion. The hole (22) is sized to receive the cylindrical portion (26), and the toothed portion (25) is of the same diameter as the cylindrical portion. Thus, since (as shown in FIG. 2) the diameter of the toothed portion (25) is substantially the same as the diameter of the through-hole (22), the diameter of the cylindrical (non-toothed) portion (26) of the tool must also be substantially the same as the diameter of the through-hole (22). Suitable standard keys are commercially available for turning screws with recesses under the trademark TORX.

When a guide bar is to be installed, it can be slid into place without regard to the position of any peg or other tensioning mechanism. The chain is laid around the guide bar (15), and the sprocket (14) and the nuts (23,24) are lightly tightened. The key is inserted through the hole (22) to cause the pinion (25) to mesh with the corrugations (17) and thereby form, in effect, a rack-and-pinion-relationship. The key is then turned by means of a handle (27) to move the guide bar until the chain has the desired tension. Without removing the key or changing the position of the chain saw, the nuts (23,24) can then be tightened by a wrench. A main advantage compared to previous tensioning mechanisms is that due to the direct action of the pinion on the corrugations, the chain tension can be easily judged by the torque acting on the key.

If for some reason another type of key is chosen as standard for the chain saw machine, such as a hexagonal key, it can be used in conjunction with an extension piece including the pinion (25) and cylindrical portion (26). The extension piece can be separate or permanently located in the hole (22) in the clamping plate (19), whereby it is only necessary to engage the key with an end of the already-installed extension piece.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A chain saw comprising:

a motor unit;

a guide bar attached to the motor unit, a portion of the guide bar including a slot extending in a longitudinal direction therein, the slot including a pair of opposing longitudinal side surfaces, at least one of the side surfaces including corrugations formed therein, the corrugations extending perpendicularly to the longitudinal direction;

a saw chain supported on the guide bar;

a clamping plate mounted to the motor unit such that the portion of the guide bar in which the slot is formed is clamped between the motor unit and the clamping plate, a through-hole extending through the clamping plate in alignment with the corrugations; and a separate toothed turning tool including a non-toothed portion and a toothed portion disposed at one end of the non-toothed portion, the non-toothed portion and the toothed portion being insertable through the through-hole to bring the toothed portion into meshing engagement with the corrugations, whereby rotation of the tool produces longitudinal adjustment of the guide bar, the non-toothed portion and the toothed portion being removable through the through-hole with the clamping plate remaining mounted to the motor unit.

2. The chain saw according to claim 1 wherein the guide bar is a reversible guide bar, and corrugations are formed on both of the side surfaces of the slot, the through-hole exposing the corrugations on one of the side surfaces, the tips of all corrugations being flush with non-corrugated portions of the respective side surfaces.

3. The chain saw according to claim 1 wherein the motor unit includes a pair of clamping bolts projecting through the slot and through corresponding holes in the clamping plate for receiving nuts to attach the clamping plate to the motor unit, the slot being open at one end of the guide bar to enable the clamping bolts to slide into and out of the slot through the one end of the guide bar, the corrugations including tips that are flush with non-corrugated portions of the respective side surface of the slot.

4. A method of adjusting a tension on a saw chain of a chain saw, the chain saw comprising a motor unit; a guide bar attached to the motor unit, a portion of the guide bar including a slot extending in a longitudinal direction therein, the slot including a pair of opposing longitudinal side surfaces, at least one of the side surfaces including corrugations formed therein; the corrugations extending perpendicularly to the longitudinal direction; a saw chain supported on the guide bar; and a clamping plate mounted to the motor unit such that the portion of the guide bar in which the slot is formed is clamped between the motor unit and the clamping plate; the method comprising the steps of: inserting a toothed turning tool through a through-hole formed in the clamping plate from an exterior of the clamping plate, to bring teeth of the turning tool into meshing relationship with the corrugations, manually rotating the turning tool while the teeth thereof are in meshing relationship with the corrugations for displacing the guide bar and varying a tension on the saw chain, and then removing the turning tool through the through-hole, the inserting and removing steps performed while the clamping plate is mounted to the motor unit.

5. The chain saw according to claim 2 wherein the toothed portion is no larger in cross section than the non-toothed portion, the non-toothed portion having a diameter substantially as large as a diameter of the through-hole.

6. The chain saw according to claim 1 wherein the toothed portion is no larger in cross section than the non-toothed portion, the non-toothed portion having a diameter substantially as large as a diameter of the through-hole.

* * * * *